United States Patent [19]

Alexander

[11] Patent Number: 4,616,762

[45] Date of Patent: Oct. 14, 1986

[54] DISPOSABLE COOKING PAN

[75] Inventor: Frederick D. Alexander, Arlington Heights, Ill.

[73] Assignee: Ekco Products, Inc., Wheeling, Ill.

[21] Appl. No.: 719,262

[22] Filed: Apr. 2, 1985

[51] Int. Cl.[4] .......................... B65D 8/08; B65D 1/39; B65D 1/42

[52] U.S. Cl. ...................................... 220/74; 206/503; 206/515; 206/518; 220/72; 229/2.5 R; 229/3.5 MF

[58] Field of Search .............................. 220/72, 74, 73; 206/509, 512, 518, 503, 505, 515, 508, 519; 229/2.5 R, 3.5 MF

[56] References Cited

U.S. PATENT DOCUMENTS

| | | | |
|---|---|---|---|
| 2,802,411 | 8/1957 | Riener | 229/3.5 MF |
| 3,098,597 | 7/1963 | Johnson et al. | 220/72 X |
| 4,113,095 | 9/1978 | Dietz et al. | 206/518 X |
| 4,167,233 | 9/1979 | Hare | 220/72 |

Primary Examiner—William Price
Assistant Examiner—Bryon Gehman
Attorney, Agent, or Firm—Neuman, Williams, Anderson & Olson

[57] ABSTRACT

A disposable cooking pan is provided which is formed from a single sheet of thin gauge metal. The pan includes a bottom panel which is delimited by a continuous upwardly and outwardly extending wall panel. Extending laterally outwardly from the upper edge portion of the wall panel is a continuous rim. The rim includes a planar outwardly extending inner section and a bead-like outer section which encompasses a multilateral area including the inner section. Relatively spaced, enlarged areas are formed in the rim inner section and are disposed adjacent portions of the rim outer section defining corners in the multilateral areas. Elongated strengthening ribs are provided in the enlarged areas of the rim inner section and extend from adjacent the rim outer section to the upper edge portion of the wall panel.

3 Claims, 7 Drawing Figures

DISPOSABLE COOKING PAN

BACKGROUND OF THE INVENTION

This invention relates to cooking pans and more particularly to such pans as are generally referred to as "disposable" pans. Modern food preparation practices have encouraged the use of "disposable" or throw-away utensils as a convenience for home use. Obviously, utensils that are to be used only once and then disposed of must necessarily be relatively inexpensive. One such inexpensive pan is formed of light or thin gauge aluminum, customarily identified as aluminum foil.

Cooking pans made from aluminum foil have the heat transference qualities associated wth the metal aluminum, and yet, because of the minimal amount of metal utilized in the structure, are not expensive and, consequently, can be disposed of after a single use.

It is noted that the convenience of having an inexpensive throw-away pan by utilizing light gauge metal e.g. aluminum, is achieved with the attendant factor that the pan has diminished structural strength. Thus, foil pans are inherently weak and not capable of carrying heavy loads. Obviously, if the gauge is increased to increase the structural integrity of the pan, the pan cost also increases.

To achieve added structural strength without increasing the metal gauge or thickness, and thus the pan cost, it is customary to form ribs of varying sizes and designs in the bottoms and walls of the pans. Also, controlled wrinkles or folds are often incorporated in the walls and the lip of the pan is curled or beaded in a variety of ways to increase the overall structural strength of the pan. All of these strength adding features have been generally successful in producing inexpensive throw-away foil pans for home cooking.

However, additional strengthening means are desirable in the larger pans such as those used for cooking heavy loads, e.g., roasts, hams, and turkeys. While it is unlikely that an aluminum foil pan can be formed with sufficient structural integrity to carry such heavy loads without additional independent exterior support means, it is nevertheless desirable to build into the foil pan configuration as many strengthening features as possible.

SUMMARY OF THE INVENTION

This invention contemplates the provision of a disposable cooking pan formed from a single sheet of thin gauge, heat conductive material to provide an octagonal sided or multilateral structure within and depending from a rim structure defining a multilateral area. Such construction forms substantially horizontal enlarged areas at predetermined locations within the rim structure. Such areas are provided with bracing portions which, in turn, impart added strength to the pan frame.

DESCRIPTION OF THE PREFERRED EMBODIMENT

Figure 1:
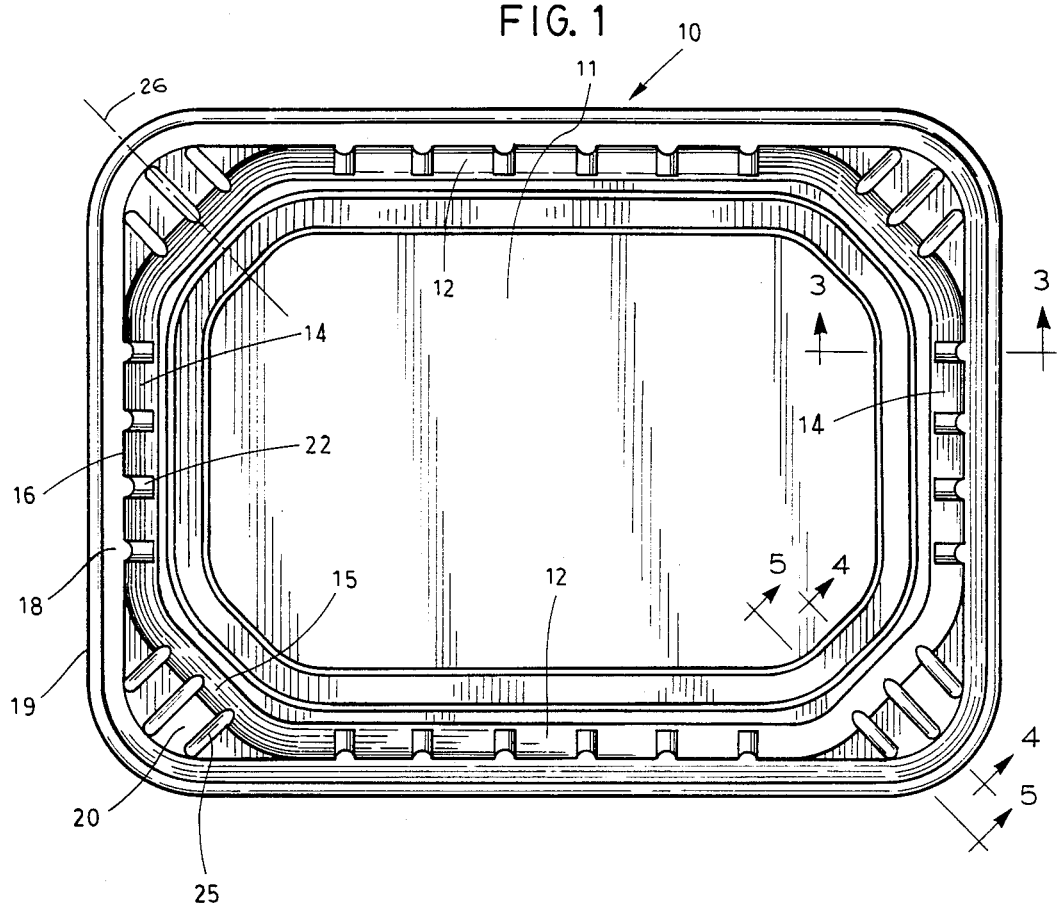
FIG. 1 is a top plan view of one form of an improved, disposable cooking pan embodying the teachings of the invention set forth herein.
Figure 3:
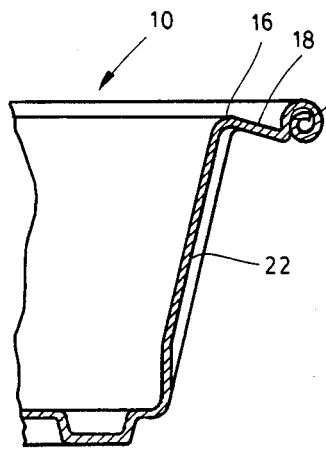
FIG. 3 is a sectional view on an enlarged scale taken along lines 3—3 of FIG. 1.
Figure 4:
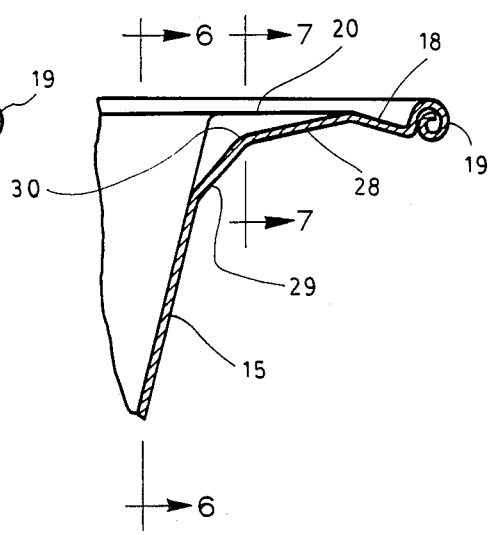
FIG. 4 is a sectional view on an enlarged scale taken along lines 4—4 of FIG. 1.
Figure 5:
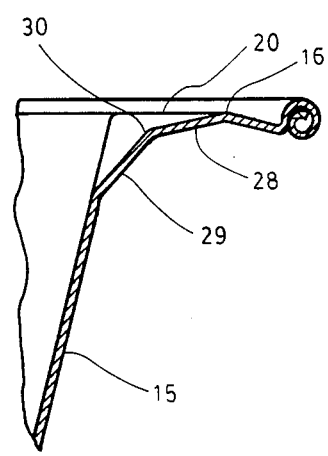
FIG. 5 is a sectional view on an enlarged scale taken along lines 5—5 of FIG. 1.
Figure 6:
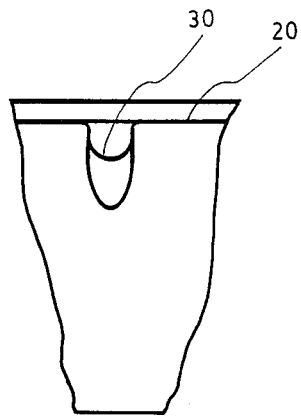
FIG. 6 is a sectional view taken along lines 6—6 of FIG. 4.
Figure 7:
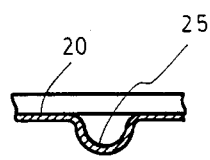
FIG. 7 is a sectional view on an enlarged scale taken along lines 7—7 of FIG. 4.

Referring to FIG. 1, the reference numeral 10 indicates an aluminum foil pan formed to provide a bottom portion 11 having upstanding opposing side wall section 12, and opposing end wall sections 14 and corner wall sections 15. As shown, in FIG. 1, all of the wall sections coact to form a continuous, upstanding wall which defines an octagonal shaped container. As seen in FIGS. 3, 4, and 5 all wall sections terminate in a continuous rim 16 which encompasses the upper edge portion of the continuous wall and projects laterally outwardly therefrom. The rim 16 includes an outwardly extending substantially planar flange or inner section 18 and an outer section or bead 19.

As shown in FIG. 1, the rim 16 is formed in a rectangular shape and the transition from an eight-sided container into a four-sided rim is accommodated by the formation in flange 18 of enlarged planar areas 20, one such planar area being formed at a corner-forming portion of the bead 19; that is to say at the uppermost portion of each corner wall 15 and interconnecting the adjacent side wall section 12 and end wall section 14. Planar area 20 acts as a brace between the adjacent side wall section 12 and end wall section 14 and as such imparts a rigidity and stability to the pan 10 that is greater than the rigidity and stability present in the usual rectangular pan having a rectangular container as well as a rectangular rim, both pans being formed from the same or similar material. Such added rigidity and stability is advantageous in resisting twisting and flexing of the pan rim 16 when lifting the pan by grasping the rim.

Figure 2:
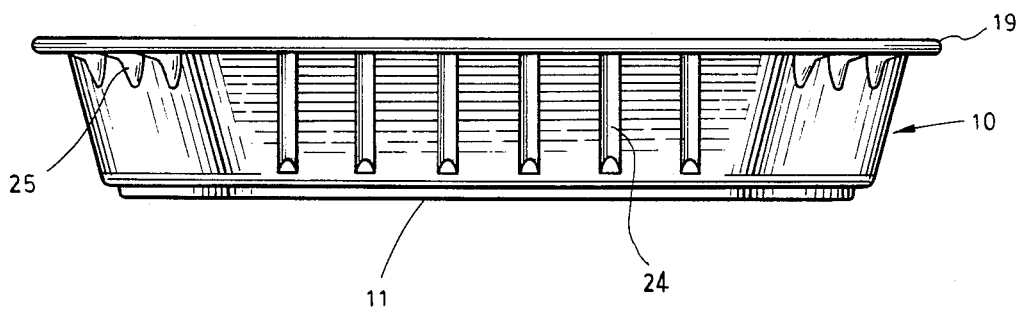
FIG. 2 is a side elevational view of the pan of FIG. 1.

Referring now to FIGS. 1, 2, and 3, the numerals 24 and 22 indicate ribs formed in the side wall sections 12 and end wall sections 14, respectively, said ribs providing added strength to said wall sections in a manner well known in the art. Such added strength is also imparted to the corner wall sections 15 and horizontal braces 20 by the formation of ribs therein, indicated by the reference numeral 25. The ribs 25 are formed in each corner brace 20 with the rib axis, indicated by the numeral 26, being angularly disposed relative to the plane of the adjacent corner wall section 15.

Referring now to FIGS. 4-7, it is noted that each rib 25 is formed in a concave manner to provide a horizontally disposed outer portion 28 disposed in the brace 20 which declines at a first angle inwardly towards the corner wall section 15 and an inner portion 29 which declines at a second angle greater than the first angle from the inner end of rib portion 28 towards the corner wall section 15. The juncture of the rib portions 28,29 forms a ridge 30, which extends in a plane normal to the rib axis 26. The rib 25 formed in this manner imparts strength to the corner brace 20 to resist both vertical and horizontal forces impacting at or near the corners of the pan.

Having now described the invention, what is claimed is:

1. A disposable cooking pan formed from a single sheet of thin gauge metal, comprising a bottom panel; a continuous wall panel encompassing said bottom panel and extending upwardly and outwardly from the periphery thereof; and a continuous rim encompassing an upper edge portion of said wall panel and projecting laterally outwardly therefrom; said rim including a substantially planar inner section and a bead-like outer section, the outer section encompassing a multilateral area including the inner section, said inner section having relatively spaced enlarged areas disposed adjacent corner-forming portions of said outer section, said enlarged areas being provided with elongated strengthening ribs extending towards the upper edge portion of said wall panel; wherein each strengthening rib formed in the enlarged areas of the rim inner section includes a first segment declining at a first angle from adjacent the rim outer section towards the wall panel and terminating a predetermined distance from the wall panel, and a second segment declining at a second angle from the termination of said first segment to the wall panel, said second angle being greater than said first angle, said second segment terminating at the wall panel at a location substantially below the upper edge portion of the wall panel.

2. The pan of claim 1 wherein the juncture of the first and second segments of each strengthening rib in the enlarged areas of the rim inner section form a transversely extending ridge.

3. The pan of claim 1 wherein the wall panel includes opposed side wall sections, opposed end wall sections, and corner wall sections interconnecting adjoining side and end wall sections, all of said wall sections being of substantially uniform thickness and coacting to form a multilateral area of a different shape than the multilateral area encompassed by the bead-like outer section.

* * * * *